United States Patent [19]

Yan

[11] Patent Number: 5,607,576
[45] Date of Patent: Mar. 4, 1997

[54] TWO PHASE TREATMENT OF GAS TO REMOVE HALOGENS

[75] Inventor: Tsoung Y. Yan, Wayne, Pa.

[73] Assignee: Mobil Oil Corporation, Fairfax, Va.

[21] Appl. No.: 367,500

[22] Filed: Dec. 30, 1994

[51] Int. Cl.$^6$ .......................... C10G 19/00; C10G 25/00; B01D 53/02; B01D 59/26
[52] U.S. Cl. .................. 208/308; 208/262.1; 208/283; 208/286; 208/299; 208/302; 201/29; 95/131; 95/132; 95/141; 95/142
[58] Field of Search ................... 208/308, 262.1, 208/283, 286, 299, 302; 201/29; 95/131, 132, 141, 142

[56] References Cited

U.S. PATENT DOCUMENTS

| | | | |
|---|---|---|---|
| 1,921,116 | 8/1933 | Caldwell | 208/283 |
| 2,034,712 | 11/1933 | Dolbear | 208/283 |
| 2,481,300 | 9/1949 | Engel | 196/36 |
| 2,658,027 | 11/1953 | Hoover | 208/284 |
| 3,457,165 | 7/1969 | Urban | 208/283 |
| 3,761,534 | 9/1973 | Sun et al. | 260/674 |
| 3,862,900 | 1/1975 | Reusser | 208/299 |
| 4,664,027 | 5/1987 | Mendiratta et al. | 208/262.1 |
| 4,992,164 | 2/1991 | McCullough et al. | 208/284 |

OTHER PUBLICATIONS

Oil & Gas Journal Item – Merichem Ad – Oct. 1994.
Copies of portions of "Opposers" work.
Lexpat Search – OGJ Sep. 17, 1990.

*Primary Examiner*—Glenn A. Caldarola
*Assistant Examiner*—Patricia L. Hailey
*Attorney, Agent, or Firm*—Malcolm D. Keen

[57] ABSTRACT

Acidic halogens, especially chlorides, are removed from a dry gas stream by contact with dry particles of solid caustic. The solid caustic particles are preferably non-porous, and disposed in a bed with at least a 10% bed interstitial volume. Limiting halogen content in gas, and operating with a bone dry gas, ensures that salts deposit on the surface of the solid caustic without plugging the bed of solid caustic. Efficient halogen removal can be achieved even when treating a bone dry gas, one having less than 10 ppmv water vapor, at ambient temperature, without plugging the bed.

17 Claims, 1 Drawing Sheet

TWO PHASE TREATMENT OF GAS TO REMOVE HALOGENS

CROSS-REFERENCE TO RELATED APPLICATIONS

This application is related to my prior application Ser. No. 08/217821 filed on Mar. 25, 1994.

This application is also related to other applications of mine filed simultaneously with this application directed to:

| DOCKET | TITLE |
| --- | --- |
| 7580 | QUADRI PHASE TREATMENT OF Gas TO REMOVE HALIDES |
| 7581 | TWO PHASE REMOVAL OF HALIDES FROM LIQUID HYDROCARBONS |
| 7582 | THREE PHASE REMOVAL OF HALIDES FROM LIQUID HYDROCARBONS |
| 7583 | REMOVAL OF ACIDIC HALIDES FROM HOT GAS STREAMS AND ATTRITION REGENERATION OF CAUSTIC |
| 7584 | DISSOLVING SALT ON SOLID CAUSTIC WITH OIL |
| 7585 | NEUTRALIZING VAPOR/LIQUID SEPARATOR |

FIELD OF THE INVENTION

This invention relates to removal of halogens, especially chlorides, from gas streams, especially reformer recycle and off gas.

BACKGROUND OF THE INVENTION

Catalytic reforming, using Pt based reforming catalyst, is one of the most important refinery processes in the world. Most refineries have a catalytic reformer, which converts naphtha fractions into high octane reformate.

Reformers come in many types and sizes—from 2000 BPD fixed bed units to moving or swing bed units processing more than 50,000 BPD. Reformers are available with fixed bed reactors, swing bed reactors, or moving bed reactors. Many new units are moving bed reactors, available from UOP, Inc, Des Plaines, Ill.

Reformers generally use mono-metallic catalysts (Pt on a support such as alumina) or bi-metallic catalyst (Pt-Re on a support). Other combinations of Pt and other metals are known.

All reforming catalysts are believed to contain halogen, almost invariably chlorine. Chlorine is now ubiquitous in catalytic reforming. Chloroplatinic acid may be used in the impregnation solution forming the catalyst. Some refiners may add chlorine coumpounds during normal operation.

One major oil company developed a Pt reforming catalyst regeneration or "rejuvenation" procedure which conducted at least some portions of the regeneration in the presence of one or more chlorine compounds. The procedure was believed originally developed for swing reactor systems which were regenerated every day or so, but this regeneration method, or some variant of it, was eventually used in semi-regenerative reformers and in moving bed reformers.

All of this chlorine can, and does, find its way into gas and liquid products from the reformer. Based on a review of several decades of The Oil and Gas Journal, the key to successful catalytic reforming is lots of chloride. For decades refiners have talked about the problems of getting enough chlorides into the system, and dealing with the chlorides in the gas and liquid products from the reformer.

In 1977 there was talk of the need for heat, chloride and moisture to redistribute platinum.

In 1980 there was a discussion of deposits of ammonium chloride in catalytic reforming compressor internals.

In 1985 there was discussion of the need for, and difficulty of maintaining, 1.0 wt % chloride on bimetallic catalyst between regenerations. It was suggested to "come out on the high side on chloride."

In *Alumina adsorbents effectively remove HCl from reformer $H_1$ gas stream,* Janke et al, Oil and Gas Journal, May 12, 1986, page 64, talked about controlled injection of organic chloride at the reformer reactor inlet, and the mischief caused by all this chloride. The problem was worse with continuous catalytic reforming processes, which were reported "to require higher levels of chloride addition for regeneration . . . " The solution proposed by the authors was use of alumina adsorbents to remove the HCl from the net off gas. This article is incorporated by reference.

In Apr. 1, 1994 there was a discussion of the problem of corrosion in fired heaters due to chloride in the hydrogen from the reforming unit. The proposed solution was to install alumina treaters.

The problem is not limited to reformers. Similar problems occur in some isomerization units, and may occur in other units which are relatively dry and use a chloride containing catalyst.

The conditions which lead to chloride problems are catalysts which contain, or reaction conditions which require, chlorine compounds, and reactants which are dry enough that no separate aqueous phase forms in the vapor/liquid separator downstream of the reactor. Essentially all Pt reformers meet these conditions, and many isomerization and other processing units meet these conditions.

The situation could be summarized as follows for Pt reformers. Although refiners may use different reforming catalysts, all the catalysts seem to contain chlorine. There is enough chlorine either present in the virgin catalyst, or from chlorine addition during reformer operation, or from chlorine added during the catalyst regeneration, so that chlorine compounds appear in all the product streams coming from the reformer. Both gas and liquid products have chlorine compounds.

The raw liquid reformate has chlorides. The net hydrogen gas make has chlorine compounds. When the raw reformate is fractionated, usually in a debutanizer, the overhead vapor fraction contains chlorine compounds.

While chlorides in liquid reformate are a serious problem, the present invention is not directed to solving that problem. Instead, the present invention focusses on removal of chlorides or other acidic halogens present in dry gas streams such as gas streams from a reformer. Of primary concern is removal of chlorides from the net gas make from the reformer vapor liquid separator, the hydrogen rich gas removed from the reformer for use in other refinery processes.

In reforming units with recontacting drums for recycle gas, it would help if some means were available to remove chlorides from recycle gas intermediate the first vapor/liquid separator and the downstream recontacting drum. There is an equilibrium between chlorides in reformate and chlorides in the gas phase, and removing chlorides from recycle gas upstream of the recontacting drum would reduce the amount of chlorides in the liquid reformate removed from the recontacting drum, as well as reducing the amount of chlorides in the recycle gas.

Another concern is removal of chlorides from gas streams generated by downstream processing of raw reformate, e.g., removing chlorides from overhead separator vapor associated with reformate fractionators.

Thus the process of the present invention focusses on removal of chlorides from gas streams, rather than from liquid streams.

It should also be clarified that while most reformers use chlorines as a catalyst component, some may use other halogens, such as F or I, but Cl is the halogen of choice, so hereafter chlorine and its reaction or degradation products will be referred to rather than halogens in general.

To solve the problem of removing chlorides from gas streams, refiners have generally used beds of solid adsorbents, such as alumina impregnated with an alkaline material such as NaOH. Such approaches are discussed in the 1994 and 1986 OGJ articles discussed above. While these approaches work, there are problems associated such alumina beds. The problems can include one or more of: cost, catalytic activity, regeneration and disposal.

Alumina beds are relatively costly, in terms of the amount of active ingredient present. The alumina material typically contains 5 to 10 wt % caustic. Alumina costs much more than caustic, and the alumina primarily serves as a support, but one which unfortunately is not always inert.

Alumina beds can exhibit catalytic activity. When alumina beds are used to remove chlorides from flowing gas streams, aluminum chloride can form, and cause catalytic reactions which convert or polymerize some of the hydrocarbon gas species into a much higher molecular weight material. In some units, the gas is turned to go, at least enough is formed that the effectiveness of the alumina bed is much impaired. This heavy viscous material must be removed to "strip" the alumina bed, so that it may be used to absorb additional amounts of chlorides or other acidic components from the flowing gas stream.

Steam stripping will "strip" such a bed, but tends to form wet HCl, which can and has attacked the metal. The HCl formed by steam stripping creates another possible emission problem. Additionally, the water produced when the steam condenses contains benzene, so the water has to be treated for benzene removal before the water can be discarded.

Finally, disposal of solid adsorbents after they are exhausted in use can be a serious waste management problem. Solid bed adsorbents must eventually be retired and the bed frequently contains too much hydrocarbon, and frequently contains too much benzene, to permit the material to be dumped into a landfill. The adsorbent bed may be steam stripped as a prelude to disposal. The resulting water/hydrocarbon product must be stripped to remove benzene from the waste water. The benzene and lighter hydrocarbons removed from the waste water are usually incinerated, and some chlorides may be present in these streams and cause problems during during incineration.

The problems of stripping alumina treaters, in reformers at least, are so severe that some refiners have resorted to expensive treatments with hot inert gas to remove liquids.

I studied the problem of chloride removal from dry gas streams and realized that much of the problem could be overcome by a different approach, which ignored much of the conventional wisdom in gas treating.

While I still made use of a simple acid/base neutralization reaction, my approach used concentrated solid caustic, rather than caustic on some form of support. Rather than use finely divided solid caustic—which one would intuitively think would be better for gas/solid contact—I used low surface area pellets, of large and uniform size and shape and having relatively little porosity inside the pellets.

I developed a way to treat hot or cool bone dry gases in a totally dry process. This aspect of my process could be used to produce salt as essentially the only product of the neutralization reaction.

This new approach to gas treating allowed significant modifications to some refinery processes. In treating reformer recycle gas I was able to remove a significant amount of the chloride present in the recycle gas. Much of the chloride that the reformer feed, or the reformate "sees" is the chloride present in the recycle gas. Because of the way many modern reformers run, with an initial vapor/liquid separator followed by a recontacting drum operating at higher pressure, the gas phase in contact with reformate in the recontacting drum (the V/L separator downstream of the recycle gas compressor) might be called the recontacting gas.

This recontacting gas, or recycle gas, is almost invariably present in large molar excess, relative to feed. Most reformers operate with 2:1 to 5:1 or even higher molar ratios of hydrogen to hydrocarbon. The recycle gas outnumbers the feed, on a molar basis. Removing much of the fugitive chloride from the recycle gas could reduce the chloride loading of the reformate. There could still be some chloride in reformate, due to extraction of chlorides from the reforming catalyst, but the problem would be reduced. This could reduce the amount of chloride in the liquid reformate stream, as well as reduce chlorides in the net gas make of the reformer.

The process could also be used to treat only the net gas make, or excess recycle gas make which is removed as one of the gas phase products of the platinum reformer. While this stream usually is not considered corrosive (it typically has less than 10 ppm water and only a few ppm chlorides) the catalytic uses to which this hydrogen rich stream is sometimes put can make the chloride content a significant problem.

The debutanizer overhead gas make from a reformer may also be treated. Although a relatively small gas stream, it typically has a higher chloride content than any other gas stream associated with the reformer, and usually must be treated for chloride removal before use as fuel or in other refinery processes.

The new approach to gas treating required a new use of an old material, and ignoring much of the art of gas treating.

Conventional wisdom said that very high surface areas were needed. The obvious approach was to disperse the caustic on a porous support, such as alumina. This better dispersed the caustic, and provided a solid support that would not collapse as the caustic was consumed in the neutralization reaction. Although many refiners use this approach, it is costly and can create problems (polymerization reactions) and disposal of spent absorbent.

I tried achieving high surface area mechanically, by simply grinding up large beads of caustic. This produced a bed of crushed caustic which efficiently removed chlorides for a short time while the bed rapidly plugged. It plugged quickly with upflow through the bed, and plugged just as quickly with downflow.

The conventional wisdom on acid base reactions is that they proceed rapidly when aqueous solutions are involved but slowly, if at all, when dry solid:gas interactions are involved. A review of Perry's Chemical Engineer's Handbook, Sixth Edition, shows many neutralization reactions involving aqueous phases, but little on solid:gas chemical reactions. There is a section, 20-72 through 20-74 which is incorporated by reference, on circulating fluid bed combustors (called CFBC units by many workers in this area) which burn relatively small amounts of coal in the presence of larger amounts of limestone or dolomite. At the temperatures involved, reported to be 800° to 900° C., sulfur compounds in the coal form $SO_2$ which reacts with limestone or dolomite to form $CaSO_4$.

There is also a discussion of using limestone for disposal of toxic or hazardous wastes by chemical capture or complete destruction. Contact times of 5 to 10 seconds at 900° to 1000° C. were reported to completely destroy most compounds. Limestone reacted with halides, sulfides, metals, etc. to form stable compounds which could be landfilled.

Thus it was known from the CFBC work that large amounts of dolomite or lime could remove small amounts of SOx and other acidic components in a circulating fluidized bed at 800° to 1000° C. This was not helpful for refinery and petrochemical plants which do not have such a high gas temperature, and or can not afford the large capital expense needed to install a circulating fluidized bed of limestone and dispose of the large quantity of spent adsorbent generated.

Many refinery streams are bone dry. Many operate at a temperature above that which permits aqueous scrubbing at low pressure, but at temperatures below those found in CFBC units or the 900° to 1000° C. used in disposal of toxic wastes. Even when gas stream temperatures are low enough to permit existence of an aqueous phase refiners may not want to have an aqueous phase around, as this greatly complicates the design of the gas treating reactor. Wet gas streams also frequently have to be dried before recycling or reuse in other hydroprocessing units.

I discovered that solid caustic could be used to recover acidic species such as halides from dry gas. The key to the process was to avoid most of the things engineers typically believe are required for effective contact and to ignore some of the conventional wisdom regards acid base reactions.

Rather than use a bed of finely divided material, with a large volume of internal pore structure, I did the opposite. I used relatively large particles of solid caustic, which were essentially nonporous. Use of relatively large beads of solid caustic provided a solid bed of mechanically strong, low surface area caustic. Use of uniform sized particles, of regular shape, gave a large void volume which would generally be thought to reduce the effectiveness of the bed at contacting a gas stream.

Closely related to this apparent step backward in bed design (low surface area) I had to ignore the conventional belief that dry gas streams at low temperature would not react at any significant rate with halides in gas streams. I found that refinery streams which were bone dry, and at ambient temperature, could be made to react with solid caustic. Some of my co-workers laughed at me when they first heard of my approach to gas treating, involving low temperatures and bone-dry gas streams.

I discovered that chlorides could effectively be removed from such gas streams by contact with large particles of non-porous solid caustic. Provided I kept the gas dry enough, the chlorides formed salt deposits on the surface of the solid caustic, and the bed did not plug. Despite my co-workers misgivings, my data showed that the process could form soft, high surface area salt deposits on large beads of low surface area solid caustic. Close inspection of the morphology indicated that the growth of fine salt deposits on the caustic is similar to iron rust on steel balls.

Fortuitously, I also developed ways to remove these salt deposits, either mechanically, or by a new, liquid hydrocarbon phase regeneration technique which could restore the chloride removal efficiency of the caustic bed. These regeneration techniques are not necessary for the practice of the present invention, although they may be used very effectively with the process of the present invention to prolong the useful life of the solid caustics.

BRIEF SUMMARY OF THE INVENTION

Accordingly, the present invention provides a process for a process for removing acidic halogens from a dry gas stream comprising: charging a gas containing less than about 2000 ppmv $H_2O$ and from 1 to 4000 wt ppm acidic halogen to a reactor; neutralizing said acid halogens in said dry gas by contact and neutralization with a dry bed of solid caustic comprising particles of solid caustic containing at least a majority by weight solid caustic, said dry bed having an interstitial volume of at least 10 volume % to produce salt; depositing at least a majority of said produce salt on said particles of solid caustic as dry salt crystals; and removing from said reactor a dry gas having a reduced acidic halogen content as a product of the process.

In yet another embodiment, the present invention provides a process for removing chlorides from gas streams from a catalytic reformer comprising: charging a dry gas stream containing less than about 1000 ppmv $H_2O$ and from 1 to 2000 wt ppm chlorides from a platinum reformer to a neutralization reactor; neutralizing said chlorides in said dry gas by contact with a dry bed of solid caustic comprising particles of solid, essentially non-porous, caustic, said dry bed having an interstitial volume of at least 12.5 volume % to produce salt; depositing at least 75% of said produced salt on said solid caustic as dry salt crystals; and removing from said reactor a dry gas having a reduced acidic halogen content as a product of the process.

BRIEF DESCRIPTION OF THE DRAWINGS

The FIGURE is a simplified schematic view of a preferred solid caustic reactor.

DETAILED DESCRIPTION OF PREFERRED EMBODIMENTS

Figure 1:
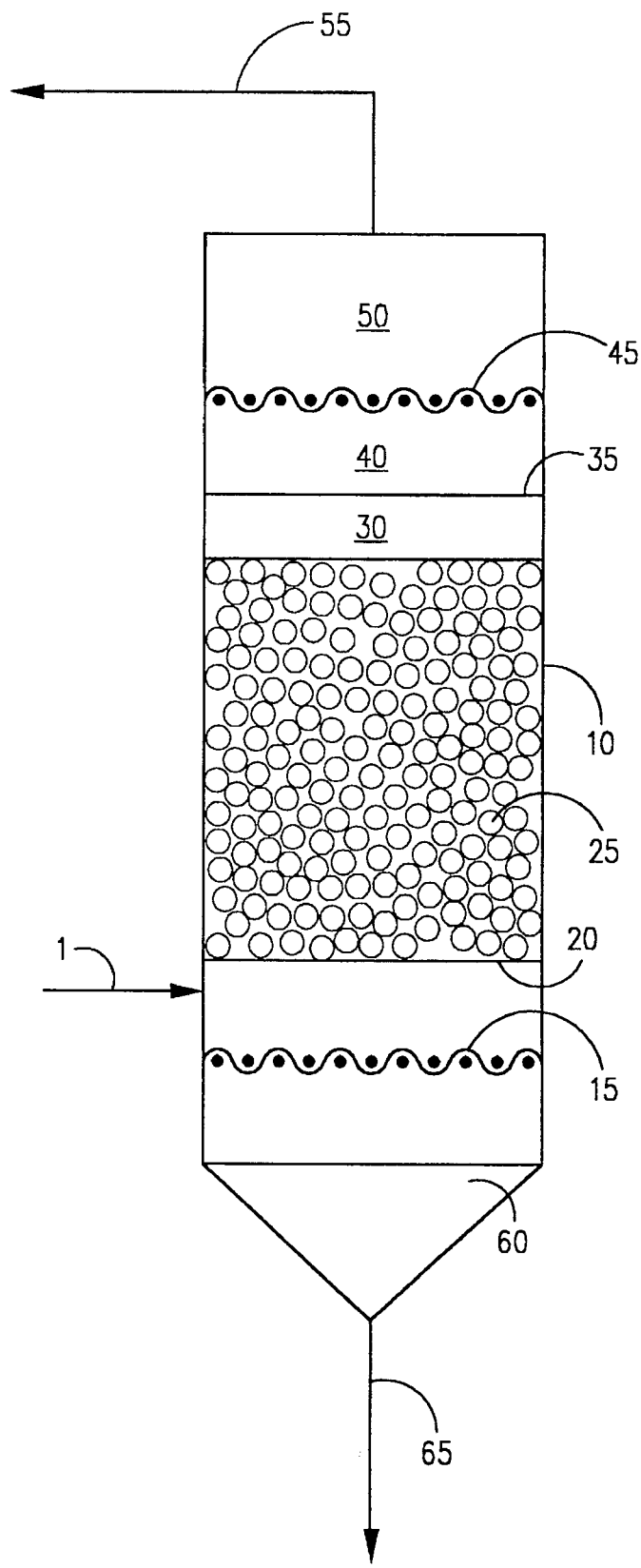

The invention can be better understood in conjunction with a review of the FIGURE which is optimized for continuous treatment of relatively cool but dry gas streams, such as reformer recycle gas, reformer net gas make or reformer debutanizer overhead receiver vapor. A dry, solid caustic bed is used in conjunction with a preferred, but optional, hydrocarbon phase regeneration system.

Basically reactor 10 holds a large fixed bed 25 containing solid caustic. Swing reactors can be used as the effectiveness caustic declines due to salt deposition, or provision may be made for periodic or continuous replacement of solid caustic. Preferably, but optionally, my surface reaction procedure is used to wash salt deposits from solid caustic using a hydrocarbon continous phase "washing" procedure.

The preferred "wash" procedure involves periodically passing a few or many bed volumes of a hydrocarbon liquid such as reformate through a saturator/salt extractor to produce a hydrocarbon liquid phase which is saturated with water. This hydrocarbon passes over the salt coated caustic, and selectively dissolves the salt crystals deposited on the surface of the solid caustic. The hydrocarbon is removed from the solid caustic bed and recycled to the solvent saturator and salt extractor. At the end of the process all hydrocarbon can be drained from the solid caustic bed and it may be returned to service for removing chlorides from dry gas.

In the solid caustic bed the solid caustic can be mixed with, or held by, solid supports such as activated carbon, woods, fibers, etc. Solid caustic flakes (if of sufficient size and mechanical integrety), pellets, nuggets or the like may be used and simply be held by screens or trays not shown.

The process works well with large beads of solid caustic, so for ease of handling and to make it easier to design the caustic bed it usually will be preferred to use large beads of solid caustic or other solid alkaline material.

Gas from line 1 is added to a lower portion of the device and passes through support means or screen 20 into the lower portion of a solid caustic bed 25. The bed is preferably primarily solid caustic on a conventional support, which may be something as simple as screens or balls of inert material. Gas passes through dry bed 25, which removes acidic components, usually chlorides, from the gas. The gas leaves the top of bed 25 dry and with a reduced chloride content. While upflow operation was described, the process could also have used downflow, or cross-flow with appropriate modifications to the piping to the bed.

For a long bed life, the solid caustic used should be non-pourous and have a relatively low surface area. If, e.g., ground caustic (a mix of small and larger particles) is used in a fixed, dry bed, the bed may plug with salt crystals in either up or down flow operation. Such a bed, with little void volume, would be susceptible to fusing should some process upset occur which adds even small amounts of water, and causes formation of an aqueous phase on the bed of caustic.

Caustic beads or other mechanically strong form of solid caustic with a shape leading to a large void volume in the reactor may safely be used for dry bed operation.

More details will now be provided about each part of the process.

GAS STREAM WITH ACIDIC COMPONENTS

The process can be used with any gas stream containing acidic halogen compounds which can react with solid caustic.

The gas stream can be mostly hydrocarbon gass and hydrogen, or inert, or an oxidizing atmosphere such as air or flue gas with minor amounts of air.

Details on some of the types of acidic halogens present in refinery streams, and the salts they form, are disclosed in *Calculations estimate process stream depositions,* Oil & Gas Journal, Jan. 3, 1994 pp 38–41, Yiing-Mei Wu. This article is incorporated by reference. It is cited to provide details on some of the many chemical species which exist in refinery and petrochemical streams.

Among the most ubuquitous halides are the chlorides, which are discussed extensively in the OGJ article above, and which cause so much mischief in refineries, and especially around and downstream of reformers. The discussion that follows will therefore focus on chlorides and reformer streams.

The process is especially useful for treating reformer recycle gas, reformer net gas make, and gas streams associated with reformer fractionators such as the off gas from the reformer debutanizer overhead receiver.

The gas stream must be dry, that is have a low relative humidity. The humidity must be low enough, or low enough relative to chloride content of the gas, so that no aqueous liquid phase forms on the caustic. Preferably the relative humidity is lower than 10%, preferably lower than 5%, and most preferably 1% or less. In absolute terms, the moisture content of the gas should be below 3000 volume ppm water, and preferably is less than 1500, and most preferably is below 300 ppm. The process works well when the gas stream contains less than 100 volume ppm water.

At high moisture levels the bed can fuse or plug. In addition to the native water in the gas, the neutralization reaction can form more water, and water from any source can lead to bed plugging. In general the process tolerates more chloride when the native water content of the gas to be treated is low.

Surprisingly, the process works well with bone dry gas streams, such as those having less than 20 ppm volume water, or less than 10 ppmv water, and even less than 5 ppmv water. I have successfully removed chlorides with a dry bed of solid caustic even with gas streams having only 1.8 ppmv water.

The gas stream may, and frequently will, have significant amounts of entrained liquid hydrocarbon. The process tolerates large amounts of liquid hydrocarbons. One of my regeneration procedures involves use of liquid hydrocarbons. Such hydrocarbon liquids can be purged with hot inerts, or they may simply be drained from the bed, leaving a minor amount of liquid hydrocarbon present. This hydrocarbon liquid does not seem to adversely affect the bed of solid caustic.

In practice, most reformer gas streams will be dry enough to treat with my dry bed process. Thus reformer net gas make or recycle gas, and reformer debutanizer overhead receiver vapor will usually be capable of being treated efficiently using a completely dry bed.

Chloride (or other acidic halogen) content may vary greatly. The incoming gas preferably has a chloride content below about 2000 ppm $HC_1$. Above this level, the inlet to the bed can plug due to the deposition of copious amounts of $NaC_1$ crystals near the inlet. The process workds well to remove chlorides when the feed has several hundred ppm $C_1$, or even less than 50 ppm $C_1$. Significant chloride removal can be achieved when the gas stream contains only 5 or 6 ppm chloride.

TYPE OF SOLID CAUSTIC

Either beads, pellets, pills, flakes, or solid caustics mixed with various supports or fillers may be used, so long as a large enough open volume is provided (or mechanical means are provided to at least periodically fluff up the bed to permit fluid flow despite salt buildup).

While use of pure NaOH—technical grade rather than reagent grade—is preferred for low cost, other materials such as glassmakers alkali (a mixture of about 20% $Ca(OH)_2$+80% NaOH), or KOH, soda lime, and like materials may also be used, though not necessarily with equivalent results.

At least a majority, and preferably at least 80%, and more preferably at least 90%, of the alkaline solid is NaOH or KOH.

SODIUM HYDROXIDE

Because sodium hydroxide is the preferred reagent for use herein, some more information about it is provided below, taken primarily from Kirk-Othmer, Alkali and Chlorine Products.

Pure, anhydrous sodium hydroxide (NaOH or caustic soda) is a white, slightly translucent crystalline solid. Although made in the form of a solid, flakes or beads, it is almost never used in the solid form. As stated therein ". . . it is used almost exclusively in water solutions . . . "

Caustic has a melting point of 318° C., and a density of 2.13 g/cc. It is highly corrosive to skin, in aqueous solutions even in moderate concentrations. Caustic is used in most refineries in this most dangerous form, as a liquid. Although it can be handled with safety if proper precautions are taken, it is much easier and safer to work with dry solid caustic (I prefer beads) than an aqueous solution of caustic.

The solid caustic can be used in the form of a high surface area material such as berl saddles, multi-lobed pellets, or the like. It is preferred to use a type of solid caustic which is non-porous, and has a large void volume. Preferably the solid caustic used has a uniform size, a regular shape, and a large enough size to prevent undue entrainment or loss of solid caustics during normal operation. Such physical properties also facilitate regeneration of the caustic bed.

Non-porous caustics are less likely to crumble or collapse than porous materials. A large void volume will reduce the pressure drop associated with gas flow through the bed, and provide space for salt crystals to form and accumulate.

Expressed in terms of % interstitial volume, the bed should have at least 10% insterstitial volume. If a 1 m cubic box of solid caustic could contain less than 0.1 cubic meters of mercury, the interstitial volume is too low.

Interstitial volumes of 10 to 50% will give good results, and preferably bed interstitial volumes are 12.5 to 40%, and most preferably are about 25 to 35%.

The solid caustics used preferably are relatively non-porous. One way to measure porosity is in terms of surface area. The solid caustics used should have a surface area of less than 1 m2/g, and preferably less than 0.5, and most preferably less than 0.1 m2/g.

The inexpensive, technical grade bead caustics commonly available have good properties for use herein. They have the shape of fairly uniform spheres and have an interstitial volume around 30–35%, and a low surface area. I have not measured the surface area, but estimate it at less than 0.1 m2/g.

I have tested these materials, and they work well, while crushed caustics—which have a much higher surface area—are not suitable as the bed plugs rapidly from salt.

NEUTRALIZATION REACTION

The neutralization reaction, discussed in more detail below, is straightforward. The chemistry is simple. Simple neutralization reactions are involved which proceed rapidly and completely which makes the process effective. The primary reactions involved are:

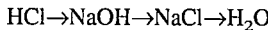
HCl→NaOH→NaCl→H$_2$O

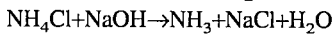
NH$_4$Cl+NaOH→NH$_3$+NaCl+H$_2$O

The salt formed deposits as a fluffy solid upon the solid caustic particles. The water is carried off in the dry gas. A clean gas exits the reactor and is charged to a gas plant, recycled to a reformer or burned as fuel.

The solid caustic may be in the form of pure particles of a suitable caustic material, such as NaOH, KOH, CaO, MgO and the like. NaOH and KOH are preferred, and use of NaOH is most preferred.

This material may be extruded, pilled, prilled, or formed using conventional techniques into any desired shape, preferably one with a high surface area to volume ratio which is mechanically strong and allows free flow through the bed.

To improve material handling it may be beneficial to add conventional solid supports to or around the solid caustic. Thus the caustic solids can be mixed with activated carbon, porous resins, woods, fibers and the like. When a support is used it preferably comprises a minority of the reactive solid, so that a majority, by weight, of the reactive solid used in the bed is caustic.

Alternatively the solid caustic may be in baskets or fiber bags, perforated tubes, trays or the like.

REACTION CONDITIONS

In terms of space velocity, the GHSV may range from 100 to 100,000 or even higher and preferably from 1000 to 10,000 GHSV. The gas superficial velocity may range from 0.01 to 20 ft/sec., preferably from 0.1 to 2 ft/sec.

Temperatures and pressures used are not narrowly critical. In general, the process works well at ambient to elevated temperatures. Typically temperatures may range from 0° to 200° C. with temperatures of 10°–50° C. giving good results. Pressures may range from subatmospheric to superatmospheric, with pressures of 0 to 3000 psig proving satisfactory. Most refiners will operate at a pressure of 10 to 2000 psig, or at the pressure of the refinery process being considered. Many reformers operate at 50 to 300–500 psig, and my process will operate well at such pressures.

Caustic is used stoichiometrically, not catalytically. Caustic is continuously consumed and coated with salt in my process and the caustic must either be replaced or the surface thereof reactivated by removing the salt.

Alternatives to reactivation include a swing reactor system or continuous addition and withdrawel systems, such as lock hoppers above and below the solid caustic bed. These can be used to add fresh solid caustic, and remove salt covered caustic, without stopping the flow of gas.

REACTOR BED DESIGN

The caustic may be disposed as a single fixed bed, moving bed, multiple fixed beds, or fluidized bed. For simplicity, most refiners will prefer to use a simple fixed bed. When a simple fixed bed reactor is used, with the solid caustic simply dumped into a reactor or onto structured packing, the following guidelines can be given. The reactor preferably contains structured packing (~1–20% of reactor volume) in a lower portion of the reactor and then solid caustic (80–95% of reactor volume). About 0–20% of the reactor at the top can be empty or filled with a demister pad. The reactor is very simple, and need only have an inlet on one side of the bed for incoming gas and an outlet on the other side of the bed for treated gas. Either upflow, downflow or cross-flow operation is possible.

Most refiners will prefer to use a simple fixed bed system. Satisfactory run lengths can be achieved, despite using solid caustic which is efficiently covered up with salt, provided the bed is large enough and the reactor has enough void volume to hold the salt deposits.

In general, a bed depth of at least about 1 foot, and preferably of at least about 3 feet is provided for salt deposition, when the gas velocity is about 0.5 ft/sec. The height of the bed desired depends to a great extent on the gas velocity, the chloride removal desired, and the chloride content of the incoming gas.

In many applications, operation with a L/D ratio of about 1 to 5 will give good results.

In many applications it will be satisfactory to remove only a majority, or 80% or 90% of the chlorides in a gas stream, and for these applications very high salt loading on the dry bed of caustic can be achieved. High salt loading, and high chloride removals can both be obtained provided the bed is large enough and long enough, with the inlet removing most of the chlorides and the outlet half of the bed achieving the desired degree of chloride removal. The bed length should be at least equal to the length of the mass transfer zone, MTZ, discussed at more length below, and preferably is at least 2 times the mass transfer zone length. At 0.6 ft/sec, the length of the mass transfer transfer zone is about 10 inches.

The salt concentration will continue to build on the inlet side of the dry bed, and can exceed 5 wt % salt, and even approach 10 wt % salt while achieving satisfactory chloride removal, as the downstream portions of the caustic bed will still remove chlorides.

In a laboratory of treating reformer gas streams, at a gas velocity of 0.6 ft/sec the length of the mass transfer zone is about 10 inches. In commercial practice, this would call for a caustic bed at least about 2 or 3 feet tall, and preferably 10 feet tall. In the commercial sized bed, most of the chlorides will be removed in the first 10–20" of bed, with the remainder of the bed serving as a "reservoir" or guard bed to remove additional chloride.

Using such a generously sized bed allows salt loadings equivalent to an excess of 5 wt % of the caustic bed (based on the total amount of dry caustic in the bed). This salt loading in one cycle is about the same as 100% consumption of a 5 wt % caustic on alumina treating bed, but without the expense and potential problems injected by using the alumina as a support for the caustic.

Salt formation will eventually increase to the point where bed replacement (with fresh solid caustic) or bed regeneration is needed. Bed regeneration is not essential for the practice of the present invention, refineries have many uses for solid caustic and for many of these uses the presence of 5 or 10 wt % salt will not be troublesome.

MASS TRANSFER ZONE

As stated previously, the size of the reactor, or the active bed within the reactor vessel, may be determined by experimentation. These experiments can size up fairly well, especially when the solid caustic tested in a laboratory is the same size as the solid caustic to be used in the commercial unit. If the superficial velocity through the pilot plant bed is the same as that in the commercial units, the results achieved will be very similar in both units.

This was confirmed by experimental work done in different size reactors, with significantly different cross sectional areas but similar superficial velocities. The two different units gave very similar results.

In addition to the experimental approach, many refiners will also like to calculate the length of a mass transfer zone. Fortunately, there is an extensive literature on such an approach.

Perry's Chemical Engineer's Handbook, 5th Edition, shows how to design a fixed-bed two-component system for ion exchange, and such an approach provides useful guidelines for designing the size of a bed of solid caustic needed to achieve a given degree of chloride removal. Thus the designer could size the bed large enough to accommodate at least the adsorption wave or exchange zone, or more likely a column 2, 3, or 5 times or more larger to provide some reserve capacity. Pages 16–23/24 are incorporated by reference.

Kirk-Othmer, Volume 1, Adsorption, Gas Separation, discusses the useful design concept of the mass-transfer zone (MTZ). FIG. 18 shows a time trace of adsorbate composition and loading. The *Mass Transfer* portion of this reference is incorporated by reference.

While such approaches are useful, they are not exact. The process of the present invention removes halides by irreversible chemical reaction, rather than an equilibrium limited mass transfer process.

A limit of sorts is reached when salt builds up on the solid caustic in an amount sufficient to coat the surface with salt. This may be a salt concentration of around 1 or 2 wt %. Salt deposition continues after this, but at a much slower rate. Very high salt concentrations can be achieved if the process is allowed to operate for a month or so. In terms used in Kirk-Othmer, the weight of unused bed (WUB) is variable with time and chloride concentration.

The theoretical approaches, based on adsorption and equilibrium, can be used with comfort in commercial applications provided a relatively low salt on caustic is chosen for the "maximum" salt loading on caustic, and a relatively high "equilibrium" halogen level is presumed at the outlet of an infinite bed.

BED REGENERATION

Although bed regeneration is not essential, I developed two regeneration procedures which can remove the salt deposits from dry bed. These procedrues are reviewed briefly below.

BED REGENERATION—HYDROCARBON WASHING

Liquid hydrocarbon, saturated with water, can be used to selectively remove the salt deposits from the bed of solid caustic without dissolving significant amounts of caustic. The key to this approach is use of a hydrocarbon continuous phase which is saturated with water. Thus a water saturated petroleum naphtha or reformate fraction could be pumped through a bed of solid caustic, then the hydrocarbon extracted with water. The water removes salt from the liquid hydrocarbon and resaturates the liquid hydrocarbon with water. Depending on salt concentration, and the amount of water in the liquid hydrocarbon, it will usually be possible to remove 80 to 90% of the salt deposits by washings using 5–50 bed volumes of water saturated liquid hydrocarbon.

The pH of the wash water used to extract salt from liquid hydrocarbon removed from the bed may be monitored as a sign of relative salt v. caustic removal and a measure of the completeness of the regeneration. I prefer to stop the regeneration when the pH is about 8.5 and no more than 9.0.

BED REGENERATION—SALT ATTRITION

An interesting feature of dry bed gas treatment process is that it forms soft, flakey salt deposits on large, non-porous solid caustic particles. Because the salt is essentially all on the surface of the caustic particles, the caustic may be "regenerated" by physically removing the salt deposits. This can be done by removing the caustic pellets and removing salt deposits by physical brushing or mild sandblasting.

An efficient salt removal technique is to fluidize the caustic particles and let particle to particle contact attrit soft salt deposits from solid caustic. Bed fluidization could be achieved with either gas or liquid, though hydrocarbon liquid should be used rather than water, as water would dissolve too much solid caustic.

Although the mechanical methods can be used for completely dry regeneration or rejuvenation, most refiners will prefer to use the hydrocarbon phase salt washing technique, or will simply dump the caustic.

EXAMPLES

The tests were designed to investigate removal of chlorides from dry gas streams. The gas stream was a bone dry, reagent grade nitrogen stream which was first passed through a reservoir filled with reformate or pretreated naphtha, to simulate a reformer recycle gas in equilibrium with a large amount of liquid reformate, then passed through a flask containing concentrated hydrochloric acid. The gas picked up chlorides as it flowed through the acid flask. The chloride concentration in the gas could be varied by varying the amount and concentration of acid in the flask. A naphtha layer over the acid layer was used to control the amount of water added to the nitrogen. A typical gas composition, using standard test methods, was 114 wt ppm $HC_1$ and 1.8 wt ppm $H_2O$.

The only time hydrocarbon solvent was present was during bed regeneration.

REACTORS

Three reactors were used. The results from all reactors were similar, an indication that the process will scale up well commercially.

The three reactors tested were, respectively:

1. Small Glass Unit—a glass reactor of 1.3 cm ID containing 31 g. of NaOH beads. The solid caustic bed was about 9" high at the start of the test. Additional solid caustic (another 36 g NaOH beads) was added after wash cycle #3 to increase the bed height to about 16". The HCl containing nitrogan gas was passed upflow at 1.6 l/min. The HCl content of the $N_2$ varied, as shown on the following tables.

2. Large Glass Unit—a glass reactor of 4.5 cm ID containing about 390 g. of NaOH beads. The solid caustic bed was 23 cm high. HCl containing nitrogen gas was passed upflow at 16.6 l/min and 0.58 feet/sec. After wash cycle #3 more solid caustic (270 g NaOH) was added to the unit, increasing the bed height to about 16". The HCl content of the $N_2$ varied, as shown on the following tables.

3. Tall Glass Unit—This reactor had the same ID as the small glass unit. Again solid caustic was added in an amount sufficient to give an initial bed of about 16" height.

The chloride used in both the small glass and large glass units was HCl, while $NH_4Cl$ was used in the tall glass unit.

The tables refer to various "wash" cycles—and this refers to my hydrocarbon phase salt removal technique. The bed of caustic would be washed with 3–5 volumes of naphtha boiling range hydrocarbon liquid which had been saturated with water. The naphtha was then extracted with water (to remove salt) and the naphtha used again to "wash" the caustic bed. This would be repeated until the was removed, based on visual observation of the caustic, or pH of the water after extracting salt—when the pH went above 9 or so, caustic rather than salt was being removed and it was time to stop the procedure.

To make the chloride material balance, the chloride content of the feed gas and the treated gas removed from reactor was determined using conventional analytical techniques, and the chloride uptake of the bed calculated as the difference.

EXPERIMENTAL RESULTS
DRY CAUSTIC

| Time | ΔP," $H_2O$ | Run Time, min | Feed ppm Cl | Product, ppm Cl | Cl Uptake, g | % Removal | $N_2$ Flowrate, L/min | Cumulative Run Time, hrs. | Comments |
|---|---|---|---|---|---|---|---|---|---|
| 12:00 PM | 0.5 | 195 | 142.50 | 16.23 | 0.05 | 88.61 | 1.6 | 3.25 | Flowrate unstable |
| 2:00 PM | 0.5 | 120 | 132.50 | 16.56 | 0.08 | 87.50 | 1.6 | 5.25 | |
| 4:00 PM | 0.5 | 120 | 112.50 | 12.71 | 0.10 | 88.70 | 1.6 | 7.25 | |
| 8:30 AM | 0.5 | 990 | 88.00 | 9.59 | 0.25 | 89.10 | 1.5 | 23.75 | |
| Wash Cycle | | | | | | | | | |
| #12:00 PM | 0.5 | 180 | 55.00 | 6.33 | 0.02 | 88.48 | 1.6 | 26.75 | |
| 4:00 PM | 0.5 | 120 | 40.00 | 5.31 | 0.03 | 86.73 | 1.6 | 28.75 | |
| 8:30 AM | 0.63 | 3870 | 25.00 | 2.35 | 0.20 | 90.61 | 1.6 | 93.25 | |
| 10:30 AM | 0.63 | 120 | 15.00 | 1.67 | 0.20 | 88.89 | 1.6 | 95.25 | |
| 12:30 PM | 0.63 | 120 | 12.50 | 1.56 | 0.21 | 87.50 | 1.6 | 97.25 | |
| 8:30 AM | 0.63 | 1200 | 9.00 | 1.27 | 0.23 | 85.94 | 1.6 | 117.25 | |
| 10:30 AM | 0.63 | 120 | 8.00 | 1.46 | 0.23 | 81.77 | 1.6 | 119.25 | |
| 12:30 PM | 0.63 | 120 | 6.50 | 1.56 | 0.23 | 75.96 | 1.6 | 121.25 | |
| Wash Cycle #2 | | | | | | | | | |
| 4:00 PM | 0.63 | 120 | 6.00 | 0.73 | 0.00 | 87.85 | 1.6 | 123.25 | |
| 8:30 AM | 0.63 | 960 | 5.50 | 0.63 | 0.01 | 88.64 | 1.6 | 139.25 | |
| 4:00 PM | 0.75 | 450 | 290.00 | 36.53 | 0.24 | 87.40 | 1.6 | 146.75 | |
| 8:30 AM | 0.75 | 6750 | 35.00 | 3.63 | 0.66 | 89.63 | 1.6 | 259.25 | |
| 10:30 AM | 0.75 | 120 | 25.00 | 4.17 | 0.67 | 83.33 | 1.6 | 261.25 | |
| 12:30 PM | 0.75 | 120 | 20.00 | 3.88 | 0.67 | 80.63 | 1.6 | 263.25 | |
| Wash Cycle #3 | | | | | | | | | |
| 4:00 PM | 0.7 | 150 | 155.00 | 14.00 | 0.04 | 90.97 | 1.6 | 265.75 | New Feed |
| 8:30 AM | 0.75 | 990 | 140.00 | 14.29 | 0.29 | 89.79 | 1.6 | 282.25 | |
| 12:00 PM | 0.75 | 180 | 125.00 | 13.82 | 0.33 | 88.95 | 1.6 | 285.25 | |
| 4:00 PM | 0.75 | 240 | 120.00 | 13.17 | 0.38 | 89.03 | 1.6 | 289.25 | |

-continued

EXPERIMENTAL RESULTS
DRY CAUSTIC

| Time | ΔP," H$_2$O | Run Time, min | Feed ppm Cl | Product, ppm Cl | Cl Uptake, g | % Removal | N$_2$ Flowrate, L/min | Cumulative Run Time, hrs. | Comments |
|---|---|---|---|---|---|---|---|---|---|
| 8:30 AM | 0.75 | 990 | 95.00 | 11.75 | 0.55 | 87.63 | 1.6 | 305.75 | |
| 4:00 PM | 0.75 | 450 | 65.00 | 3.20 | 0.60 | 95.08 | 1.6 | 313.25 | Bed + 36 g NaOH |
| 8:30 AM | 0.75 | 990 | 47.00 | 1.65 | 0.69 | 96.49 | 1.6 | 329.75 | |
| 4:00 PM | 0.75 | 450 | 42.50 | 1.67 | 0.73 | 96.07 | 1.6 | 337.25 | |
| 8:30 AM | 0.75 | 990 | 31.50 | 1.23 | 0.79 | 96.10 | 1.6 | 353.75 | |
| 4:00 PM | 0.75 | 450 | 28.00 | 1.21 | 0.81 | 95.66 | 1.6 | 361.25 | |
| 9:00 AM | 0.75 | 3900 | 17.00 | 0.79 | 0.94 | 95.32 | 1.6 | 426.25 | |
| 1:00 PM | 0.75 | 240 | 13.50 | 0.60 | 0.95 | 95.56 | 1.6 | 430.25 | |
| 4:00 PM | 0.75 | 180 | 172.50 | 9.33 | 1.00 | 94.59 | 1.6 | 433.25 | |
| 8:30 AM | 0.75 | 990 | 156.50 | 7.90 | 1.30 | 94.95 | 1.6 | 449.75 | |
| 8:30 AM | 0.75 | 1440 | 139.00 | 6.17 | 1.68 | 95.56 | 1.6 | 473.75 | |
| 8:30 AM | 0.75 | 1440 | 121.00 | 6.95 | 2.01 | 94.25 | 1.6 | 497.75 | |
| 8:30 AM | 0.75 | 1440 | 109.00 | 6.47 | 2.31 | 94.07 | 1.6 | 521.75 | |
| 8:30 AM | 0.75 | 3870 | 101.00 | 6.05 | 3.04 | 94.01 | 1.6 | 586.25 | |
| 4:00 PM | 0.75 | 450 | 98.50 | 5.33 | 3.12 | 94.59 | 1.6 | 593.75 | |
| 9:30 AM | 0.75 | 1500 | 89.00 | 5.09 | 3.38 | 94.28 | 1.6 | 618.75 | |
| 4:00 PM | 0.75 | 450 | 85.50 | 5.87 | 3.45 | 93.14 | 1.6 | 626.25 | |
| 9:00 AM | 0.75 | 1020 | 79.00 | 5.20 | 3.60 | 93.42 | 1.6 | 643.25 | |
| 4:00 PM | 0.75 | 450 | 75.50 | 5.16 | 3.66 | 93.17 | 1.6 | 650.75 | |
| 8:30 AM | 0.75 | 990 | 71.50 | 5.14 | 3.79 | 92.81 | 1.6 | 667.25 | |
| 4:00 PM | 0.74 | 1890 | 60.50 | 5.93 | 4.00 | 90.21 | 1.6 | 698.75 | |
| 8:30 AM | 0.75 | 3870 | 52.00 | 6.60 | 4.35 | 87.30 | 1.6 | 763.25 | |
| 4:00 PM | 0.75 | 450 | 112.50 | 5.55 | 0.10 | 95.07 | 1.6 | 770.75 | Wash Cycle #4 |
| 8:30 AM | 0.75 | 990 | 110.50 | 4.91 | 0.31 | 95.55 | 1.6 | 787.25 | |
| 12:30 PM | 5.25 | 120 | 184.97 | 21.27 | 0.42 | 88.50 | 17.3 | 2 | |
| 2:30 PM | 5.38 | 120 | 184.97 | 19.81 | 0.85 | 89.29 | 17.3 | 4 | |
| 4:30 PM | 5.38 | 120 | 147.98 | 16.65 | 1.19 | 88.75 | 17.3 | 6 | |
| 10:30 AM | 5.25 | 240 | 139.64 | 14.79 | 1.83 | 89.41 | 16.9 | 8 | |
| 12:00 PM | 5.25 | 195 | 96.39 | 16.09 | 2.15 | 83.31 | 16.6 | 34 | |
| 2:00 PM | 5.25 | 120 | 89.16 | 17.27 | 2.33 | 80.63 | 16.6 | 36 | |
| 4:00 PM | 5.25 | 120 | 81.93 | 17.11 | 2.49 | 79.12 | 16.6 | 38 | |
| 8:30 AM Wash Cycle #1 | 5.25 | 990 | 57.83 | 13.13 | 3.41 | 77.30 | 16.6 | 54.5 | |
| 2:00 PM | 5.25 | 180 | 43.11 | 3.86 | 0.15 | 91.05 | 16.7 | 57.5 | |
| 4:00 PM | 5.25 | 120 | 38.55 | 4.53 | 0.23 | 88.25 | 16.6 | 59.5 | |
| 8:30 AM | 5.25 | 3870 | 24.10 | 2.89 | 1.93 | 88.00 | 16.6 | 124 | Scrubber Dry |
| 10:30 AM | 5.25 | 120 | 14.46 | 1.77 | 1.97 | 87.78 | 16.6 | 126 | |
| 12;30 PM | 5.25 | 120 | 10.12 | 1.61 | 1.99 | 84.13 | 16.6 | 128 | |
| 8:30 AM | 5.25 | 1200 | 6.75 | 0.20 | 2.15 | 97.02 | 16.6 | 148 | Scrubber Dry |
| 10:S0 AM | 5.25 | 120 | 6.02 | 1.20 | 2.16 | 80.00 | 16.6 | 150 | |
| 12:30 PM Wash Cycle #2 | 5.25 | 120 | 5.30 | 1.16 | 2.17 | 78.18 | 16.6 | 152 | |
| 4:00 PM | 5.25 | 120 | 268.26 | 23.18 | 0.61 | 91.36 | 16.7 | 154 | |
| 8:30 AM | 5.25 | 960 | 237.13 | 23.87 | 4.89 | 89.93 | 16.7 | 170 | |
| 4:00 PM | 5.25 | 450 | 215.57 | 24.11 | 6.69 | 88.82 | 16.7 | 177.5 | |
| 8:30 AM | 4.75 | 6750 | 107.78 | 16.17 | 19.59 | 85.00 | 16.7 | 290 | |
| 10:30 AM | 5.25 | 120 | 9.58 | 1.76 | 19.61 | 81.63 | 16.7 | 292 | |
| 12:30 PM Wash Cycle #3 | 5.25 | 120 | 7.19 | 1.42 | 19.63 | 80.26 | 16.7 | 294 | |
| 4:00 PM | 5.25 | 150 | 91.02 | 8.76 | 0.26 | 90.37 | 16.7 | 296.5 | New Feed |
| 8:30 AM 70 g NaOH added to unit | 5.25 | 990 | 76.65 | 7.13 | 1.69 | 90.70 | 16.7 | 313 | |
| 12:00 PM | 5.25 | 180 | 67.07 | 2.22 | 1.94 | 96.69 | 16.7 | 316 | |
| 4:00 PM | 5.25 | 240 | 52.69 | 1.48 | 2.20 | 97.20 | 16.7 | 320 | |
| 8:30 AM | 5.25 | 990 | 38.32 | 1.48 | 2.96 | 96.14 | 16.7 | 336.5 | |
| 4:00 PM | 5.25 | 450 | 28.74 | 0.91 | 3.22 | 96.83 | 16.7 | 344 | |
| 8:30 AM | 5.25 | 990 | 20.12 | 0.61 | 3.62 | 96.95 | 16.7 | 360.5 | |
| 4:00 PM | 5.25 | 450 | 19.02 | 0.70 | 3.79 | 96.31 | 16.7 | 368 | |
| 8:30 AM | 5.25 | 990 | 15.47 | 0.51 | 4.10 | 96.72 | 16.7 | 384.5 | |
| 4:00 PM | 5.25 | 450 | 13.32 | 0.63 | 4.22 | 95.30 | 16.7 | 392 | |
| 9:00 AM | 5.25 | 3900 | 6.80 | 0.27 | 4.75 | 96.00 | 16.7 | 457 | |
| 1:00 PM | 5.25 | 240 | 5.94 | 0.23 | 4.78 | 96.06 | 16.7 | 461 | |
| 4:00 PM | 5.25 | 180 | 114.97 | 4.79 | 5.20 | 95.83 | 16.7 | 464 | |
| 8:30 AM | 5.25 | 990 | 101.08 | 3.59 | 7.21 | 96.45 | 16.7 | 480.5 | |
| 8:30 AM | 5.25 | 1440 | 86.71 | 3.47 | 9.71 | 96.00 | 16.7 | 504.5 | |
| 4:00 PM | 5.25 | 450 | 72.81 | 3.33 | 10.37 | 95.43 | 16.7 | 512 | |
| 8:30 AM | 5.25 | 990 | 60.02 | 2.92 | 11.55 | 95.13 | 16.7 | 528.5 | |
| 8:30 AM | 5.25 | 1440 | 110.66 | 7.12 | 14.66 | 93.56 | 16.7 | 552.5 | |

EXPERIMENTAL RESULTS
DRY CAUSTIC

| Time | ΔP," H₂O | Run Time, min | Feed ppm Cl | Product, ppm Cl | Cl Uptake, g | % Removal | N₂ Flowrate, L/min | Cumulative Run Time, hrs. | Comments |
|---|---|---|---|---|---|---|---|---|---|
| 8:30 AM | 5.25 | 3870 | 80.48 | 4.56 | 20.79 | 94.34 | 16.7 | 617 | |
| 4:00 PM | 5.25 | 450 | 70.42 | 3.76 | 21.42 | 94.66 | 16.7 | 624.4 | |
| 9:30 AM | 5.25 | 1500 | 120.24 | 5.89 | 25.00 | 95.10 | 16.7 | 649.5 | |
| 1:30 PM | 5.25 | 240 | 10.54 | 0.29 | 25.05 | 97.22 | 16.7 | 653.5 | |
| 4:00 PM | 5.25 | 150 | 47.43 | 1.53 | 25.19 | 96.77 | 16.7 | 656 | |
| 9:00 AM | 5.25 | 1020 | 114.01 | 4.87 | 27.52 | 95.72 | 16.7 | 673 | |
| 4:00 PM | 5.25 | 450 | 103.95 | 3.86 | 28.46 | 96.29 | 16.7 | 680.5 | |
| 8:30 AM | 5.25 | 990 | 89.10 | 3.46 | 30.23 | 96.12 | 16.7 | 697 | |
| 4:00 PM | 5.25 | 450 | 87.66 | 3.50 | 31.02 | 96.01 | 16.7 | 704.5 | |
| 4:00 PM | 5.25 | 1440 | 121.68 | 5.35 | 34.52 | 95.60 | 16.7 | 728.5 | |
| 8:30 AM | 5.25 | 3870 | 93.56 | 4.67 | 41.70 | 95.00 | 16.7 | 793 | |
| 4:00 P, | 5.25 | 450 | 89.01 | 4.75 | 42.49 | 94.66 | 16.7 | 800.5 | |
| 8:30 AM | 5.25 | 990 | 86.80 | 4.86 | 44.18 | 94.40 | 16.7 | 817 | |
| 9:00 AM | | 1440 | 246.93 | 37.67 | 0.57 | 84.75 | 1.5 | 24 | |
| 9:00 AM | | 1440 | 236.80 | 36.59 | 1.11 | 84.55 | 1.5 | 48 | |
| 8:30 AM | | 1440 | 227.20 | 38.33 | 1.62 | 83.13 | 1.5 | 72 | |
| 8:30 AM Wash #1 | | 1440 | 229.87 | 42.89 | 2.12 | 81.34 | 1.5 | 96 | |
| 8:30 AM | | 3870 | 226.13 | 32.50 | 1.41 | 85.63 | 1.5 | 160.5 | |
| 9:30 AM | | 1500 | 248.53 | 36.52 | 2.00 | 85.31 | 1.5 | 185.5 | |
| 9:00 AM | | 1410 | 242.13 | 37.86 | 2.54 | 84.36 | 1.5 | 209 | |
| 4:00 PM | | 450 | 241.07 | 38.28 | 2.71 | 84.12 | 1.5 | 216.5 | |
| 8:30 AM | | 990 | 236.27 | 41.54 | 3.07 | 82.42 | 1.5 | 233 | |
| 4:00 PM | | 1890 | 226.13 | 40.95 | 3.73 | 81.89 | 1.5 | 264.5 | |
| 8:30 AM | | 3870 | 219.20 | 42.91 | 5.01 | 80.42 | 1.5 | 329 | |
| 4:00 PM | | 400 | 217.60 | 32.40 | 5.15 | 85.11 | 1.5 | 335.7 | |
| 8:30 AM | | 990 | 216.00 | 31.95 | 5.49 | 85.21 | 1.5 | 352.2 | |

Based on visual observations, the salt deposits were fine NaCl crystals on the surface of NaOH pellets. The salt looked like the iron rust on an iron plate. Close inspection showed that the NaOH beads were wrapped in a layer of loose NaCl, which acts as a barrier to keep HCl/NH4Cl in the gas from contacting the NaOH for reaction. This barrier is the reason that chloride removal gradually declines as the on-stream time increases and the thickness of the NaCl deposit increases.

In commercial units, the frequency of regeneration, or bed replacement, will depend on the size of the NaOH bed and the rate of chloride input. In terms of the chloride loading capacity for a 10 foot bed, it is proven by the lab tests that the chloride can be loaded above 5 or 6%, that is 5 or 6 grams of chloride removed per 100 grams of solid caustic in the bed.

For the commercial size bed, it should be possible to have an even higher loading, proably on the order of up to 10%. This represent close to 6–12 months of operation for many commercial reformers. By way of comparison, the loading capacity of non-regenerable promoted alumina is typically 5 or 6 g of $C_1$ per 100 g of alumina.

This means that run lengths will be about the same using cheap, dry caustic in my process as using expensive impregnated alumina. The dry caustic is regenerable, using simple procedures I have developed, while impregnated alumina is not.

My process, if a regeneration procedure is used, generates either dry salt (mechanical regeneration) or brine (hydrocarbon wash regeneration). To dispose of treated alumina frequently requires hot, inert gas stripping to removed adsorbed or formed hydrocarbons, and may generate benzene containing waste.

The dry bed treatment process provides refiners with an efficient and economical way to remove excess chlorides and other acidic halogens from their gas streams without creating more problems. The process uses the cheapest materials, in a highly reliable dry bed form.

In terms of cost and use of resources, the process of the present is one to two orders of magnitude more cost-effective than use of alumina treaters to remove acidic halogens from gas. When the disposal costs are also considered, alumina gas treating can cost from 50 to perhaps 100 times as much as dry caustic bed treating plus surface reactivation, as can be seen from the following comparison:

| | Dry Caustic Bed | Alumina Treater |
|---|---|---|
| Cost, $/# | 0.3 | 1.5 (est.) |
| Capacity, #/# | 0.95 | 0.06 |
| Disposal $/# | 0 | 0.3 |
| Total Cost, $/# $C_1$ | 0.32 | 30.0 |

In the estimate above, for the cost of removing 1 # of chloride using alumina treaters, my dry bed caustic process can remove 93.75 # of chlorides.

The process of the present invention provides a significant advance in refinery and chemical plant gas treatment processes.

Now acidic gas streams can be treated without formation of viscous oils, as occurred with some adsorbents. Adsorbent swelling and bed plugging are eliminated. High capacity and reactivity of my new bed permit use of smaller reactors and longer cycle lengths. Chlorides and other acidic halogens may be safely removed from gas streams, without creating hazardous waste which requires further treatment and eventual disposal.

I claim:

1. A process for removing acidic halogens from a dry gas stream comprising:

a. charging a gas containing less than about 2000 ppmv $H_2O$ and from 1 to 4000 wt ppm acidic halogen to a reactor;

b. neutralizing said acid halogens in said dry gas by contact and neutralization with a dry bed of solid caustic comprising particles of solid caustic containing at least a majority by weight solid caustic, said dry bed having an interstitial volume of at least 10 volume % to produce salt;

c. depositing at least a majority of said produced salt on said particles of solid caustic as dry salt crystals; and d. removing from said reactor a dry gas having a reduced acidic halogen content as a product of the process.

2. The process of claim 1 wherein said dry gas has less than 2000 wt ppm acidic halogen content and less than 1000 ppmv water vapor.

3. The process of claim 1 wherein at least a majority of said acidic halogens are chlorides.

4. The process of claim 1 wherein said bed of solid caustic is selected from the group of a fixed bed, an ebulatted bed, a moving bed, and a fluidized bed.

5. The process of claim 1 wherein said bed of solid caustic is a fixed bed.

6. The process of claim 1 wherein said solid caustic is selected from the group of KOH, NaOH, and mixtures thereof.

7. The process of claim 1 wherein said caustic is essentially pure NaOH or pure KOH.

8. The process of claim 1 wherein said solid caustic particles consist essentially of non-porous solid caustic particles and are mixed with a solid support.

9. The process of claim 1 wherein said bed is a fixed bed with an interstitial volume of 12.5 to 40% of total bed volume, said gas flows through said bed at a superficial gas velocity of at least 0.1 feet/sec, said bed has a thickness, as measured in the direction of gas flow, of at least 1 foot, said solid caustic is KOH or NaOH or mixtures thereof in particles having a surface area of less than 1 square meter per gram, and said process operates at a temperature of ambient to 200° C.

10. The process of claim 1 wherein said gas contains less than 500 wt ppm chlorides and less than 100 ppmv water vapor.

11. A process for removing chlorides from gas streams from a catalytic reformer comprising:

a. charging a dry gas stream containing less than about 1000 ppmv $H_2O$ and from 1 to 2000 wt ppm chlorides from a platinum reformer to a neutralization reactor;

b. neutralizing said chlorides in said dry gas by contact with a dry bed of solid caustic comprising particles of solid, essentially non-porous, caustic, said dry bed having an interstitial volume of at least 12.5 volume % to produce salt;

c. depositing at least 75% of said produced salt on said solid caustic as dry salt crystals; and d. removing from said reactor a dry gas having a reduced acidic halogen content as a product of the process.

12. The process of claim 11 wherein said dry gas has less than 200 ppmv water vapor.

13. The process of claim 11 wherein said bed is a fixed bed, an ebulatted bed or a moving bed.

14. The process of claim 11 wherein said bed is a fixed bed with an interstitial volume of 25 to 35% of total bed volume, said dry gas flows through said bed at a superficial gas velocity of at least 0.5 feet/sec, said bed has a thickness, as measured in the direction of gas flow, of at least 2 feet, said solid caustic is KOH or NaOH or mixtures thereof in particles having a surface area less than 1 square meter per gram, and said process operates at a temperature of ambient to 100° C.

15. The process of claim 11 wherein said dry gas is a reformer recycle gas stream or a net gas make from the recycle gas stream and contains less than 10 ppmv water vapor.

16. The process of claim 11 wherein said dry gas is a gas stream from a debutanizer associated with said reformer.

17. The process of claim 11 wherein said neutralization reaction continues until a total of at least 5 wt % salt is deposited on said solid caustic as dry salt crystals.

* * * * *